United States Patent [19]

Wright

[11] Patent Number: 4,937,574
[45] Date of Patent: Jun. 26, 1990

[54] DATA CONVERSION

[75] Inventor: Derek T. Wright, West Sussex, United Kingdom

[73] Assignee: British Broadcasting Corporation, London, United Kingdom

[21] Appl. No.: 141,689
[22] PCT Filed: Apr. 23, 1987
[86] PCT No.: PCT/GB87/00266
§ 371 Date: Jan. 26, 1988
§ 102(e) Date: Jan. 26, 1988
[87] PCT Pub. No.: WO87/06786
PCT Pub. Date: Nov. 5, 1987

[30] Foreign Application Priority Data

May 1, 1986 [GB] United Kingdom ............... 8610733

[51] Int. Cl.$^5$ .............................................. H03M 7/00
[52] U.S. Cl. ...................................... 341/106; 341/51; 341/55
[58] Field of Search ............... 340/347 DD; 364/715, 364/723, 726, 736, 737, 740; 371/37, 38, 41, 43, 47, 48; 341/138, 140, 118, 106; 370/79, 112

[56] References Cited

U.S. PATENT DOCUMENTS

| 4,020,334 | 4/1977 | Powell et al. | 364/726 |
| 4,177,355 | 12/1988 | Fleisher et al. | |
| 4,185,273 | 1/1980 | Gowan | 341/70 |
| 4,275,265 | 6/1981 | Davida et al. | |
| 4,512,020 | 4/1985 | Krol et al. | 371/43 |
| 4,573,035 | 2/1986 | Dolazza | 341/138 |
| 4,764,751 | 8/1988 | Kimura | 341/140 |

FOREIGN PATENT DOCUMENTS 5356074 12/1988 France .

OTHER PUBLICATIONS

Proceedings of the IEEE, vol. 67, No. 3, Mar. 1979 "Privacy and Authentication: An Introduction to Cryptography", Diffie, W., et al. pp. 397–426.
Proceeding of IEEE, vol. 63, No. 11, Nov. 1975, "Some Cryptographic Techniques for Machine-to-Machine Data Communications", Feistel, H. et al., pp. 1545–1554.
Japanese Patent Abstract, vol. 9, No. 280 (E-356) (2003), Nov. 8, 1985 JP, A, 60123139 (OKI) Jul. 1, 1985.
Chapter 3, "The Data Encryption Standard," Davies and Price, Security for Computer Networks, John Wiley & Sons.

Primary Examiner—William M. Shoop, Jr.
Assistant Examiner—Brian K. Young
Attorney, Agent, or Firm—Robert F. O'Connell

[57] ABSTRACT

In a method for converting n data input bits to n data output bits, groups of m data input bits from an input data buffer (10) are used as address input for a plurality of identical substitution look-up tables (20 to 27). Each look-up table (20 to 27) has a plurality of groups of m data output bits stored at a plurality of locations in the table. The output bits held at each location within the look-up tables (20 to 27) are dependent on a control word taken from a control word register (11).

18 Claims, 2 Drawing Sheets

DATA CONVERSION

BACKGROUND OF THE INVENTION

The present invention relates to data conversion, in particular to a data conversion method performed in apparatus comprising two complementary units, the first of which converts a block of n data input bits to a block of n data output bits and the second of which performs the inverse of the conversion effected by the first unit.

The invention is defined in the claims appended hereto, to which reference should now be made.

BRIEF SUMMARY OF THE INVENTION

It is anticipated that a data conversion method and apparatus embodying of the invention will be used in the field of broadcasting where the conversion apparatus used at the receiving end of a data transmission link is likely to be replicated many times. It is, therefore, desirable that the second unit, which performs the "inverse" conversion should be made as simple and inexpensive as possible. Any consequential complication to the transmission or forward conversion unit which may result can be accepted.

A simple and inexpensive "inverse" conversion apparatus may be constructed using the data conversion method of the invention.

BRIEF DESCRIPTION OF THE DRAWINGS

A data conversion method and apparatus in accordance with the invention will now be described, by way of example, with reference to the drawings, in which.

DESCRIPTION OF THE PREFERRED EMBODIMENTS

Figure 1:
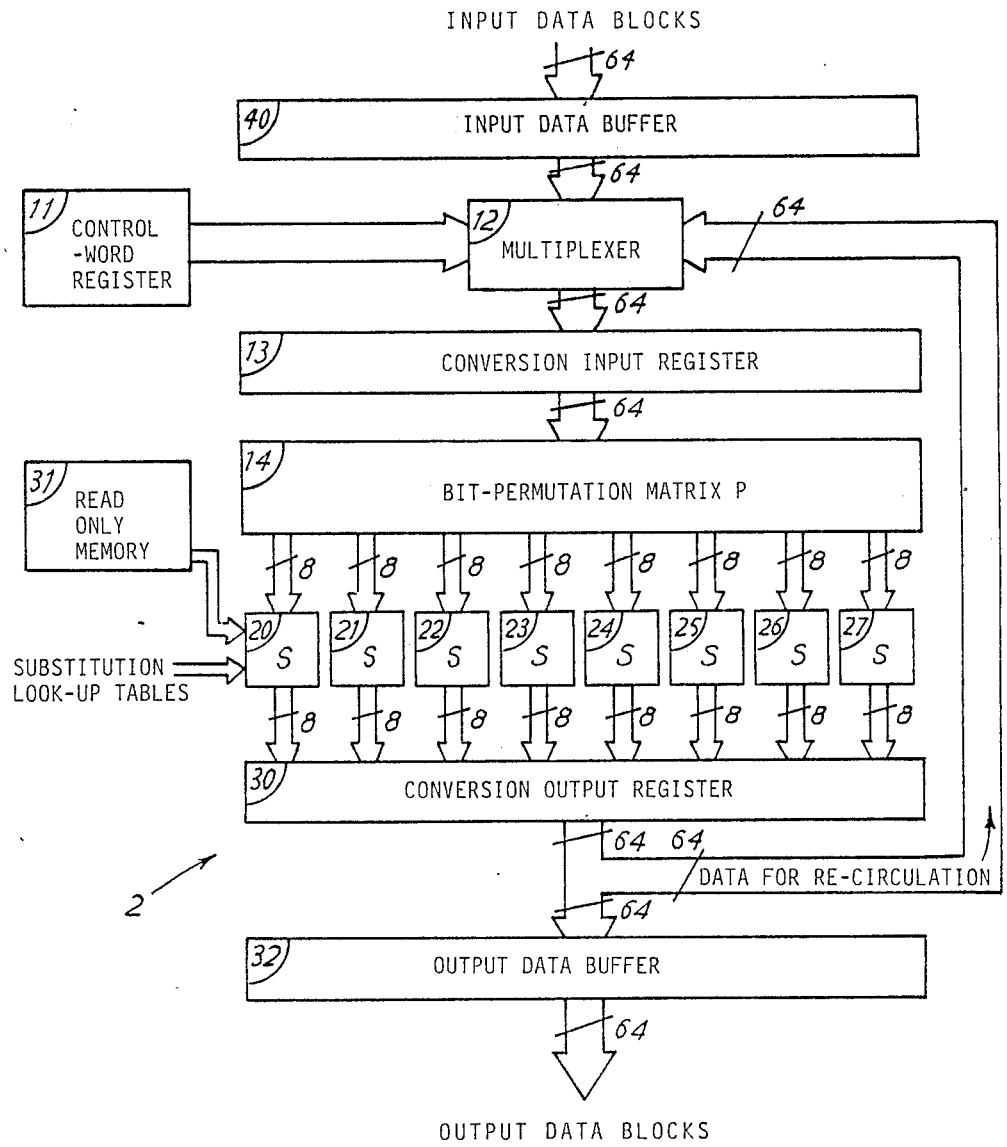
FIG. 1 is a block diagram of a data conversion unit in accordance with the invention.

As mentioned above, it is envisaged that the first and second data conversion units should be used at the input and output ends of a data transmission link. The unit 2 shown schematically in FIG. 1 is intended to be used at the output end of the data link and thus carries out the "inverse" data conversion process.

The unit 2 comprises an input data buffer 10 coupled to the input of a conversion input register 13 by means of a three-way multiplexer 12. A control-word register 11, which holds the next version of a control word used to control the conversion performed by the unit 2, can also be connected to the conversion input register 13 by means of the multiplexer 12.

The conversion input register 13 feeds a bit-permutation matrix 14 whose outputs are coupled to eight identical substitution look-up tables 20 to 27. The outputs of the look-up tables 20 to 27 are connected to a conversion output register 30 which is connected in turn to an output data buffer 32 and, through the multiplexer 12 to the conversion input register 13.

The input data buffer 10 holds a 64 bit input data block received from a data link (not shown). The conversion input register 13 is fed via the three-way multiplexer 12 with a block of 64 bits of data from one of three sources; the input data buffer 10, the control word register 11 or with data recirculated from the conversion output register 30, according to the stage of the conversion process which has been reached. At the beginning of the conversion process, the 64 bit input data block received from the data link held in the input data buffer 10 is fed to the conversion input register 13 and its output is then applied to the bit-permutation matrix 14 which effectively rearranges the order of the data bits from the conversion input register 13. The bit-permutation matrix 14 can be defined by a table which defines, for each output bit, the bit-number of the corresponding input bit. Thus for a 64 bit input block this table will contain 64 six-bit numbers. Unless the conversion process is to be a one-way function, the table must contain all possible six-bit numbers (0 to 63 inclusive) with each value appearing only once throughout the 64 locations.

The output bits from the bit-permutation matrix 14 are then split into groups of eight bits, each group then being used as the address input to one of the eight identical substitution look-up tables 20 to 27. There is one look-up table for every eight bits in the input data block. The eight identical substitution look-up tables 20 to 27 each store 256 eight-bit words, the output word selected being dependent on the eight-bit input address obtained from the bit-permutation matrix 14. Where the required speed of operation of the conversion process is sufficiently low to permit it, the eight tables 20 to 27 may be replaced with a single table and a suitable multiplexer.

The look-up tables 20 to 27 are stored in random access memory so that the values of the table entries can be changed as a function of the control word stored in the control word register 11. The initial values of the table entries are obtained from a read only memory 31. During the conversion process the entries in the look-up tables 20 to 27 have values dependent on the control word as will be described in greater detail below.

The eight output bits from each of the look-up tables 20 to 27 are assembled into the output conversion register 30. At the end of conversion process, the contents of the register 30 are transferred to an output data buffer 32. However, it is intended that the conversion process will involve circulating the data block several times through the bit-permutation matrix 14 and the substitution look-up tables 20 to 27. Thus the 64 bit data block held in the conversion output register 30 is, at intermediate stages in the conversion process, returned to the conversion input register 13 via the three-way multiplexer 12. The number of times the data block is re-circulated following an initial input from input data buffer 10 is to be specified as a system parameter but should be at least eight to ensure that a single bit change in the input data block cannot be correlated with bit changes in the output data block. Preferably, a single bit change in the input data should change, on average, 32 bits of the output data.

In order that the conversion function can have an inverse, the substitution look-up tables 20 to 27 must be such that all possible output bit combinations appear and so that each such combination appears only once. Therefore, the tables 20 to 27 each contain the values 0 to 255 inclusive, arranged randomly relative to the addressed locations. The initial values contained in the read only memory 31 conform to this pattern. As mentioned above, the contents of the look-up tables 20 to 27 during the conversion process are dependent on the control word held in the control-word register 11 but they must nevertheless meet this requirement. This is achieved by changing the table contents by means of a series of location-swapping operations.

Thus, before the unit 2 is used for a data conversion process, the contents of the substitution look-up tables 20 to 27 are initialised as follows.

The control word from the control-word register 11 is fed into the conversion input register 13 by means of multiplexer 12. At the same time, the basic values for the look-up tables 20 to 27 are loaded into the tables from the read only memory 31. The bits making up the control word held in the control input register 13 are then subjected to conversion by passing them through the bit-permutation matrix 14 and look-up tables 20 to 27 as in the data conversion process proper. The output from the conversion output register 30 may be re-circulated one or more times via multiplexer 12 to the conversion input register 13. (The number of passes through the bit-permutation matrix 14 and look-up tables 20 to 27 is specified as a system parameter).

After the specified number of passes, the contents of the eight bytes in the conversion output register 30 are used to specify the addresses of four pairs of locations in the look-up tables 20 to 27. The values in these pairs of locations are swapped. The exchange of values at the same pairs of locations is carried out in all eight tables 20 to 27.

This process, that is, the specified number of passes through the bit-permutation matrix 14 and look-up tables 20 to 27 followed by the swapping of locations of four pairs of values, is repeated until a specified number of location-pair swaps have been performed. For example, 256 swaps may be specified, that is, 64 sets of four swaps, each set of swaps being preceded by, say, two passes of the data through the matrix 14 and look-up tables 20 to 27. This would require a total of 128 uses of the bit-permutation matrix 14 and substitution look-up tables 20 to 27 and on average 87% of the locations in the tables will have had their contents changed at least once.

Once the required number of location-pair swaps has been made, initialisation of the look-up tables 20 to 27 is complete and the data conversion process proper can proceed. The data input block of 64 bits held in the input data buffer 10 is loaded into the conversion input register 13 by multiplexer 12 and is then circulated through the bit-permutation matrix 14 and substitution look-up tables 20 to 27 a specified number of times, for example, eight times, to achieve the required conversion.

Thus the initialised values in the look-up tables 20 to 27, and hence, the eventual contents of the output data buffer 32, are determined by the control word held in control-word register 11.

As mentioned above, the conversion process effected by the data conversion unit 2 is intended to occur at the receiving end of a data link. The non-inverse or forward conversion at the transmitting end is derived from the inverse conversion already described.

Figure 2:
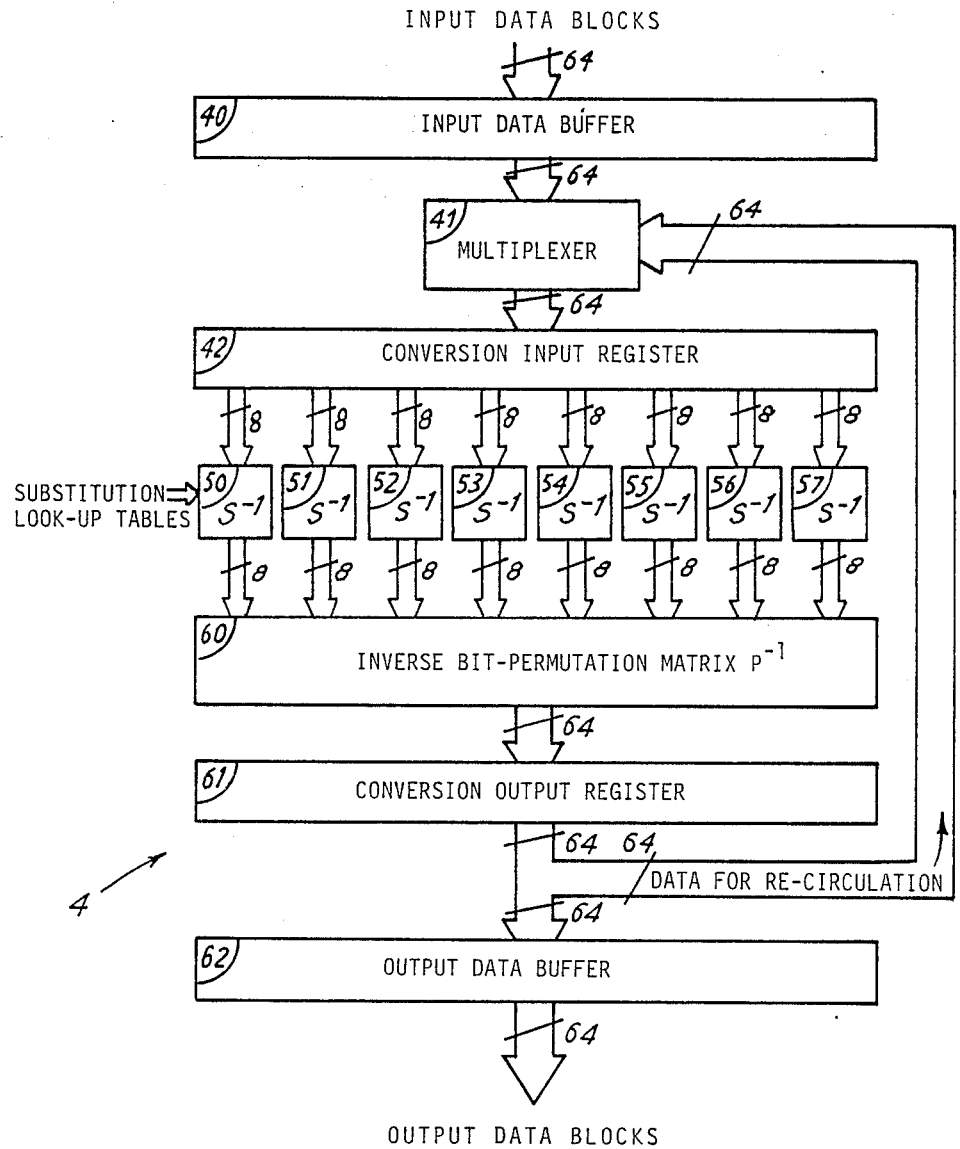
FIG. 2 is a block diagram of a complementary data conversion unit for use with the unit of FIG. 1.

A complementary forward conversion unit 4 for use with the "inverse" conversion unit 2 of FIG. 1 is shown in FIG. 2. The forward conversion unit 4 comprises an input data buffer 40 coupled to a conversion input register 42 through a multiplexer 41. The output of the conversion input register 42 is applied to eight identical substitution look-up tables 50 to 57 the outputs of which are, in turn, applied to a bit-permutation matrix 60. The bit-permutation matrix 60 is coupled to a conversion output register 61 which is connected to an output data buffer 62 and, by means of the multiplexer 41, to the conversion input register 42.

The apparatus provided at the transmission end of the data link may also include an arrangement similar to that shown in FIG. 1 but lacking any input from a data link or other external data source. This arrangement is used as a dummy decoder during the initialising of the look-up tables.

The unit 2 of FIG. 1 is operated as described above to initialise the values in the look-up tables 20 to 27 using the control word bits from the control word register 11. At the same time the dummy decoder arrangement associated with the forward conversion unit 4 of FIG. 2 is operated, using the same control word bits, to initialise the values in an identical set of look-up tables. The contents of the look-up tables in the dummy decoder are then used to produce the inverse values to be used in the look-up tables 50 to 57 of the forward conversion unit 4.

The transformation of the table values to provide the inverse is straightforward. If in the look-up tables of the dummy decoder a value y appears at location x then in the inverse tables 50 to 57 of the forward conversion unit 4, value x is placed at location y. Doing this for all locations x in turn in the first table will fill all locations in the second table (in irregular order with increasing values).

Once initialised, the forward conversion unit operates as follows.

The contents of the input data buffer 40, which holds a block of 64 bits of input data, can be loaded into the conversion input register 42 by means of the multiplexer 41. The output of the conversion input register 42 is split into eight groups of eight bits, each of which address one of the eight identical substitution look-up tables 50 to 57. The look-up tables 50 to 57 are the inverses of the substitution look-up tables 20 to 27 of FIG. 1. The eight sets of eight bits formed by the look-up table outputs are fed into the bit-permutation matrix 60 which is the inverse of the bit-permutation matrix 14 of FIG. 1. The output of the inverse bit-permutation matrix 60 is fed to the conversion output register 62 from which it is re-circulated to the conversion input register 42 through the multiplexer 41 until it has completed the specified number of passes through the look-up tables 50 to 57 and bit/conversion matrix 60. Once the required number of passes has been completed the block of 64 bits of output data is transferred to the output data buffer 62.

The control word is changed at predetermined intervals, for example, at the end of every transmission or following transmission of a specified number of blocks of data. The control words are randomly chosen and the chosen words may be conveyed between the input and output conversion units by any suitably secure means, for example, the postal service, by messenger or by a separate protected data link.

It is anticipated that the method described would be implemented by means of a software algorithm in which case the figures may be regarded as information flow charts rather than block circuit diagrams.

Although the conversion process has been described in relation to blocks of 64 bits, it will be appreciated that the number of bits in each block may be other than sixty-four. The number of input and output data bits must however be an exact multiple of the number applied to each look-up table, if a one way function is to be avoided. Similarly, the number of bits applied to each look-up table may be other than eight, provided that it is a submultiple of the number of bits in the input and output data blocks. A one way function will result where the number of input bits applied to a table is not the same as the number of output bits from the table, from partial use of the input or output bits of a table or from the sharing of input bits by more than one table.

In some circumstances, a one way function may be desirable and this can be achieved by a suitable choice of the initial values of the look-up tables 20 to 27 and of the table defining the bit-permutation matrix 14. A device incorporating a one-way function has no inverse as such as the unit of FIG. 2 would become irrelevant and impossible to construct.

As described, the control word has the same number of bits as the input and output data blocks but it may be of any length less than or equal to the length of the input and output blocks. Where a shorter control word is used, the length can be made up with logical ones, logical zeros or any constant bit pattern. The control word can appear at any position relative to the field of the input data block.

Finally, the number of iterations in the conversion process can be varied as can the number of iterations and of location-pair swaps in the initialisation of the substitution look-up tables 20 to 27. For example, the number of iterations between successive location-pair swaps could be increased.

I claim:

1. In a method of converting n data input bits to n data output bits which includes the step of applying groups of m data input bits as address input to a substitution look-up table having a plurality of groups of m data output bits stored at a plurality of locations therein and wherein the output bits held at each location within the look-up table are dependent on a control word comprising a plurality of bits applied to the look-up table; the improvement comprising
   applying groups of the m data bits forming the control word to the look-up table as address input; and
   varying the contents of the look-up table in dependence on the data bits output by the look-up table following the application of groups of m data bits from the control word.

2. In a method according to claim 1 and further comprising the step of re-locating groups of data output bits stored in the look-up table in a manner determined by the data bits output by the look-up table when the control word is applied to the look-up table as address input.

3. In a method according to claim 2 in which the re-locating step includes exchanging the groups of m data output bits held at one or more pairs of locations within the look-up table determined by the data bits output by the look-up table.

4. In a method according to claim 2 and further comprising the step of
   applying the data output bits obtained from the look-up table, following application of the control word, to the input of the look-up table, and
   re-circulating said data output bits through the look-up table one or more times prior to each change to the contents of the look-up table.

5. In a method according to claim 1 and further including the step of changing the order of the data input bits prior to being applied to the look-up table.

6. In a method according to claim 5 wherein said order is changed by means of a bit permutation matrix.

7. In a method according to claim 1 wherein the control word has n bits.

8. In a method according to claim 4 wherein the steps of varying the contents of the look-up table and re-circulating the data bits outputs by the look-up table through the look-up table are repeated a predetermined number of times.

9. A method of converting n data input bits into n data bits for transmission through a data transmission link and for converting the n data bits received following transmission through the link into n data output bits corresponding to the n data input bits, in which the conversion process carried out at the receiving end of the link is in accordance with claim 1, the contents of the look-up table being determined and the inverse look-up table being provided for use in converting the input data bits into the data bits for transmission.

10. Apparatus for converting n data input bits into n data output bits including a substitution look-up table having a plurality of locations addressable by groups of m data input bits each containing a group of m output bits, means for storing a control word, and means for changing the contents of the look-up table in dependence on the data bits output by the look-up table and in response to the application of groups of the m data bits forming the stored control word as address input to the look-up table.

11. Apparatus according to claim 10 including means for storing a plurality of groups of m data bits which are initially fed into the plurality of locations in the look-up table, means for applying the control word to the input of the look-up table, and means for changing the contents of the look-up table in dependence on the data bits output by the look-up table.

12. Apparatus according to claim 11 in which the means for varying the contents of the look-up table includes means for re-locating the groups of m data bits held in the look-up table in response to the data bits output by the look-up table.

13. Apparatus according to claim 12 in which the means for re-locating includes means for exchanging the groups of m data bits held at one or more pairs of locations within the look-up table.

14. Apparatus according to any of claims 10 to 13 including means for applying the data bits output by the look-up table to the input of the look-up table so that the bits can be re-circulated through the look-up table one or more times prior to each change made to the contents of the look-up table.

15. Apparatus according to claim 10 including means for changing the order of the bits in the group of n data input bits prior to applying them to the look-up table.

16. Apparatus according to claim 15 in which the means for changing the said order is a bit-permutation matrix.

17. Apparatus according to claim 11 comprising a plurality of identical look-up tables each of which has locations addressable by a group of m data bits selected from the n data input bits.

18. In a method according to claim 1 wherein the improvement further comprises the steps of
   providing an inverse look-up table;
   applying n pre-transmission data bits to said inverse look-up table to provide n inverted pre-transmission data bits;
   transmitting said n inverted pre-transmission data bits through a data transmission link and
   applying said n transmitted data bits as the n data input bits in said converting method.

* * * * *